2,965,442

ALKALI METAL CYANIDE PROCESS

Forrest L. Turbett, 1513 Roosevelt, Joplin, Mo.

No Drawing. Filed Feb. 21, 1957, Ser. No. 641,449

4 Claims. (Cl. 23—81)

This invention relates to the production of alkali metal cyanides.

The alkali metal cyanides first became commercially important with the development of the electroplating process for gold and silver in which they were used. With the subsequent introduction of the cyanide process for the extraction of gold and silver from low-grade ores, sodium cyanide became an industrially important chemical. In addition to its important uses in the mining industries, sodium cyanide also finds use as a dye intermediate and for case hardening and heat treating of steel. It also serves as an important source of hydrogen cyanide which is used as a fumigant and in the production of many valuable organic intermediates.

Among the commercial methods of producing sodium cyanide, the best known is probably the reaction of metallic sodium, ammonia and carbon, and is called the Castner process. Also of commercial importance is the reaction of hydrogen cyanide gas with sodium hydroxide to produce sodium cyanide.

An old method, known as the Bucher process, which is the reaction of sodium carbonate with carbon and nitrogen, catalyzed by iron, gave satisfactory conversions to sodium cyanide on laboratory scale but pilot plant and commercial operations were economically disappointing. Apparently, one of the chief difficulties was the nature of the hot, incandescent charge which was a sticky, semi-solid mass not amenable to a continuous process. The nature of the molten charge prevented intimate contact with the influent nitrogen gas and precluded efficient heat transfer throughout the mass.

The object of this invention is to provide a new and improved method for the production of alkali metal cyanides. A further object is to provide a method that will lend itself to a continuous process. A still further object is to provide a process that utilizes relatively inexpensive raw materials to produce commercially valuable alkali metal cyanides and elemental iron.

I have found that this is accomplished by the reaction of alkali metal ferrites with carbon and molecular nitrogen to produce the alkali metal cyanide and metallic iron. Where normal ferrite is used the reaction may be represented by the following equation:

$$M_2Fe_2O_4 + 6C + N_2 \rightarrow 2MCN + 4CO + 2Fe - 90{,}360 \text{ cal.}$$

wherein M represents an alkali metal.

By employing a mixture of granular alkali metal ferrite and carbon, the result is a granular, free flowing charge which lends itself to a continuous process since it retains these properties at the optimum reaction conditions. The free flowing charge is easily agitated, thereby providing rapid and intimate contact with the influent nitrogen gas and efficient heat transfer throughout the mass. At the optimum reaction conditions the process gives nearly quantitative yields of alkali metal cyanide and elemental iron.

To effect the reaction, alkali metal ferrite is mixed with carbon and heated at an elevated temperature below the melting point of the alkali metal ferrite. An atmosphere of nitrogen or mixtures of nitrogen with other gases is maintained in the furnace throughout the reaction period. Preferably the granular charge is agitated during the heating period to insure intimate contact with the nitrogen and efficient heat transfer.

The resulting alkali metal cyanide may be isolated by extraction of the reaction product mixture with a suitable solvent such as water or liquid ammonia. I have found that the use of liquid ammonia as a solvent gives a more pure crystalline product. Removal of ammonia yields white, crystalline, chemically pure alkali metal cyanide. The insoluble residue may be washed with water containing an oxidation inhibitor such as sodium carbonate and the elemental iron isolated by magnetism or other suitable means.

The alkali metal ferrites are prepared by known methods such as the reaction of various mole ratios of an alkali metal carbonate with iron oxides; R. Knick and E. Kohlmeyer, Zeitschrift anorg. u. allgem. Chemie, 244, 67 (1940). Commercial mill scale, which is a mixture of iron oxides, may be used in the production of the ferrites. Thus, one may utilize a comparatively inexpensive iron oxide as a raw material in the production of the ferrites and obtain pure elemental iron as a final product from the cyaniding process.

The alkali metal ferrites, viz, sodium ferrites, potassium ferrites and mixtures thereof used should have a melting point above the particular cyaniding reaction temperature employed so that the charge retains the advantages of its initial granular characteristics and does not become sticky and difficult to handle during the reaction. In general, alkali metal ferrites which melt above about 1100° C. may be used since the cyaniding reaction is ordinarily readily accomplished below this temperature. There is, accordingly, no practical reason for using higher temperatures. The composition of alkali metal ferrites which melt above about 1100° C. may vary considerably and still be useful in the process. Thus, satisfactory alkali metal ferrites for the process may contain from about 10 to about 90 mole percent of either $K_2O$ or $Na_2O$, or mixtures thereof. Because of this flexibility in the composition of alkali metal ferrites which may be used it is possible to control the relative quantities of alkali metal cyanide and iron produced. The alkali metal ferrites should be finely divided or granular. Ferrites of a mesh size of about 60 to about 200 give particularly good results.

Although a large excess of carbon may be used in the charge, it is generally advisable to use a slight stoichiometric excess by using about 0.5 to 0.75 part by weight of carbon to one aprt by weight of alkali metal ferrite. Since most commercial forms of carbon contain volatile impurities, such as water or organic material, it is advisable to preheat the carbon before use. Heating at 600–900° C. for 1–2 hours is usually sufficient to remove most of the volatile impurities. Most any form of amorphous carbon, preferably of 60 to 200 mesh has been found satisfatcory. Examples of such carbonaceous materials would include charcoal, such as from hard and soft woods, sugar charcoal, and coconut charcoal, coal and cokes such as petroleum coke and pitch coke.

The physical nature of the charge may be advantageously altered by use of pitch as a partial source of carbon. The alkali metal ferrite is mixed with enough pitch to provide about 10–20% of the stoichiometric amount of carbon and the mixture calcined at 400–500° C. in the absence of air to give a very porous charge. The balance of the carbon is provided by the addition of such material as wood charcoal.

The nitrogen may be an atmosphere of nearly pure nitrogen or admixed with other gases. I have found that using a mixture of nitrogen and ammonia in the process results in a coarser and more easily separable iron product. In the practice of this invention the optiumum conditions would include maintaining over the charge an atmosphere rich in molecular nitrogen during the reaction period.

The charge is heated at a temperature below the melting point of the alkali metal ferrite for the period of time required for completion of the reaction. The course of the reaction may be followed by an analysis of the effluent gases. A substantial drop in the carbon monoxide content indicates a nearly complete reaction. I have found that at a reaction temperature of about 1000–1100° C. the reaction is essentially complete in 0.5 to 10 hours, and at the optium reaction temperature of 1000–1070° C., less than two hours is required. It is obvious that the required heating period will vary with the mesh size of reactants, furnace construction, source of nitrogen, and the like.

The following examples serve to further illustrate how the invention may be carried out in practice, but the invention is not restricted to the said examples.

*Example 1*

A stoichiometic mixture of 106 grams of powdered sodium carbonate and 159.7 grams of ferric oxide was heated in a stainless steel tray for 2 hours at 800° C. Analysis of the granular, yellow-brown normal sodium ferrite gave 27.6% $Na_2O$, 50.0% Fe, and 0.2% $CO_2$. A mixture of 24.2 grams of the sodium ferrite which had been milled to 100 mesh size and 15.8 grams of 100–200 mesh wood charcoal was heated for 2.5 hours at 1050° C. in a stainless steel rotary tube furnace. A current of nitrogen was maintained through the furnace during the heating period. The granular product mixture was extracted with water and filtered. Volumetric analysis of the filtrate gave 9.32 grams of sodium cyanide, which represents an 87.0% conversion. The crude iron was separated from the dry filter cake magnetically and washed with a dilute aqueous solution of sodium carbonate. A second magnetic separation gave 9.2 grams of sponge iron which assayed 92% iron. This represents a 70% recovery of iron.

*Example 2*

A mixture of 166 grams of commercial mill scale, which analyzed 98.6% iron oxides, and 212 grams of powdered sodium carbonate was heated in a stainless steel tray for 2.5 hours at 875° C. The quantities used represent a 2:1 ratio of $Na_2O$:iron oxides. Analysis of the dark green colored, granular, basic ferrite gave 35.9% $Na_2O$, 35.2% Fe and 11.7% $CO_2$. A mixture of 15.8 grams of wood charcoal and 24.2 grams of the ferrite, both of 100 mesh size, was heated in a stainless steel rotary tube furnace at 1050° C. for 2 hours. A current of nitrogen was maintained through the furnace during the reaction period. Volumetric analysis of an aqueous extraction of the granular product mixture gave 11.2 grams of sodium cyanide, which represents an 81.2% conversion.

*Example 3*

A mixture of 18.2 grams of normal potassium ferrite and 11.8 grams of wood charcoal was heated with a flow of nitrogen in a stainless steel rotary tube furnace at 1065° C. for 2 hours. Extraction with water and analysis in the usual manner gave 7.63 grams of KCN, which represents an 81.7% conversion.

*Example 4*

A mixture of 18.2 grams of normal sodium ferrite and 11.8 grams of petroleum coke which was 100–200 mesh size and contained 1% sulfur was heated with a flow of nitrogen in a stainless steel rotary tube furnace at 1065° C. for 2 hours. Extraction with water and analysis in the usual manner gave 5.87 grams of sodium cyanide, which represents a 72.8% conversion. Magnetic separation gave 7.8 grams of sponge iron which assayed 97% iron and which is suitable for powder metallurgy.

*Example 5*

A mixture of 25 grams of normal sodium ferrite and 15 grams of wood charcoal of 80–100 mesh was heated in a stainless steel rotary tube furnace at 1050° C. for 2 hours. A stream of nitrogen was maintained through the furnace during the reaction. The granular, reaction product mixture was extracted with liquid ammonia, filtered, and the ammonia evaporated to yield 10.0 grams of white, crystalline sodium cyanide of 97.3% purity, which represents a conversion of 87.9%.

*Example 6*

A mixture of 24.2 grams of normal sodium ferrite and 15.8 grams of wood charcoal was heated in a stainless steel rotary tube furnace at 1050° C. for two hours. A flow of a nitrogen-ammonia mixture, consisting of 35% ammonia and 65% nitrogen by volume, was maintained through the furnace during the reaction. Extraction with water and analysis in the usual manner gave 7.6 grams of sodium cyanide which represents an 81.5% conversion. The elemental iron was in a coarse, more easily separable condition.

Various changes and modifications of the invention can be made and, to the extent that such variations incorporate the spirit of this invention, they are intended to be included within the scope of the appended claims.

What is claimed is:

1. The process which comprises agitating and heating a mixture of one part by weight of a previously prepared granular alkali metal ferrite of 60–200 mesh size, said ferrite having a melting point above 1100° C., and about 0.5 to 0.75 part by weight of granular carbon of 60–200 mesh size in the presence of a mixture of nitrogen and ammonia, each gas being present in a substantial amount, at a temperature of 1000–1100° C. for about 0.5 to 2 hours to produce an alkali metal cyanide and elemental iron.

2. The process of claim 1 in which the alkali metal is sodium.

3. The continuous process for the production of an alkali metal cyanide and elemental iron which comprises heating and agitating a mixture having a composition of one part by weight of a previously prepared granular alkali metal ferrite of 60–200 mesh size, said ferrite having a melting point above 1100° C. and about 0.5 to 0.75 part by weight of granular carbon of 60–200 mesh size in a furnace in the presence of a mixture of ammonia and nitrogen, each gas being present in a substantial amount, and at a temperature of 1000–1100° C. for about 0.5 to 2 hours to produce a mixture of an alkali metal cyanide and elemental iron, removing the mixture of alkali metal cyanide and elemental iron from the furnace while simultaneously introducing a substantially equivalent amount of the mixture of ferrite and carbon to the furnace, and separating the iron from the alkali metal cyanide.

4. The process of claim 3 in which the alkali metal is sodium.

References Cited in the file of this patent

UNITED STATES PATENTS

| | | |
|---|---|---|
| 1,143,952 | Freeman | June 22, 1915 |
| 1,186,367 | Ashcraft | June 6, 1916 |
| 1,283,716 | Foersterling | Nov. 5, 1918 |

FOREIGN PATENTS

| | | |
|---|---|---|
| 28,667 | Great Britain | of 1903 |
| 119,957 | Germany | Apr. 19, 1901 |
| 489,451 | Germany | Jan. 30, 1930 |